United States Patent [19]

Tomita

[11] 4,019,944
[45] Apr. 26, 1977

[54] METHOD OF AND HIGH FREQUENCY WELDER ASSEMBLY FOR BINDING A COVER MATERIAL ONTO A BASE MATERIAL

[75] Inventor: Keiji Tomita, Tondabayashi, Japan

[73] Assignee: Kabushiki Kaisha Tomita Sangyo, Osaka, Japan

[22] Filed: Mar. 19, 1975

[21] Appl. No.: 559,703

[30] Foreign Application Priority Data

Dec. 6, 1974  Japan .......................... 49-144795

[52] U.S. Cl. ............................ 156/380; 156/479
[51] Int. Cl.$^2$ ...................... B32B 19/02; B32B 3/04
[58] Field of Search .......... 156/216, 380, 273, 475, 156/227, 479, 477 B

[56] References Cited

UNITED STATES PATENTS

| | | | |
|---|---|---|---|
| 1,811,871 | 6/1931 | Anthony | 156/479 |
| 2,517,672 | 8/1950 | Jenkins | 156/380 |
| 2,808,099 | 10/1957 | Silverman | 156/479 |
| 3,075,862 | 1/1963 | Hoyer | 156/216 |
| 3,089,536 | 5/1963 | Bolles et al. | 156/479 |
| 3,147,172 | 9/1964 | Wesa et al. | 156/216 |
| 3,580,770 | 5/1971 | Dyal | 156/216 |
| 3,791,908 | 2/1974 | Gidge | 156/380 |

*Primary Examiner*—Douglas J. Drummond
*Attorney, Agent, or Firm*—Griffin, Branigan and Butler

[57] ABSTRACT

A method and apparatus for binding the marginal edge of a cover material which has been folded over the periphery of a base material, the method comprising applying varying amounts of heat across the width of the marginal edge where the amount of heat applied at the folding line of the marginal edge of the cover material is less than that applied at portions of the marginal edge removed from the folding line. The apparatus includes means for generating high frequency electrical energy; pressing means for pressing the marginal edge against the base material and applying the electrical energy to the marginal edge to bind it to the base material, the pressing means including an electrically conductive first portion for conducting the high frequency electrical energy and at least one electrically insulative second portion where both the first and second portions contact the marginal edge so that the heat applied across the width of the marginal edge varies. The apparatus also includes a folding frame having a plurality of separable folding sections and means for moving the sections with respect to one another so that when brought together they form a unitary structure. The cover material is disposed on a table and underlaid over one side of the base material so that the marginal edge of the cover material substantially vertically extends above the base material. The apparatus also includes means for lowering the folding frame to the table and includes means for maintaining the folding sections in their separated condition while the frame is being lowered to the table; means for drawing the folding sections together after the frame has been lowered to the table to fold and press the marginal edge over the base material; and means for applying the high frequency electrical energy to the marginal edge to effect the binding thereof to the base material. The torque limit-

5 Claims, 11 Drawing Figures

METHOD OF AND HIGH FREQUENCY WELDER ASSEMBLY FOR BINDING A COVER MATERIAL ONTO A BASE MATERIAL

BACKGROUND OF THE INVENTION

1. Field of the Invention

This invention relates to a high frequency welder assembly and in particular, to a welder system for binding a cover material onto a base material.

2. Discussion of the Prior Art

Prior art apparatus includes means for pulling the marginal edge of a cover material over a base material without providing for decreasing temperatures caused by the high frequency energy applied to the binding portion of the cover material whereby the marginal edge of the cover material tends to be excessively thin, deformed and easily torn.

SUMMARY OF THE INVENTION

A primary object of this invention is to provide a method for applying high frequency, soldering heat to the marginal edge of a cover material which has been folded over a base material, the amount of heat applied varying across the width of the marginal edge where the heat variation may be effected by attaching insulating sheets to the outer side or both sides of a folding frame whereby the marginal lower end face of the folding frame may be lowered to press the marginal edge of the cover material and solder the marginal edge to the base material without being torn.

A further object of this invention is to provide a high frequency welder assembly employing a folding frame of the above type.

A further object of this invention is to provide a high frequency welder assembly including a folding frame having four separable sections normally extended apart from each other and means for drawing the sections together driven by an air motor or the like whereby the marginal edge of the cover material may be automatically folded over the base material, continuously pressed thereon, and then heated thereto by the molding frame.

A further object of this invention is to provide a high frequency welder assembly operatively associated with an air driven press apparatus or the like and a high frequency generating device wherein the following steps are sequentially executed: effecting the press operation, supplying electric current to a folding frame and interrupting the current during the drawing operation of the folding sections.

Thus, according to this invention, a cover material is underlaid over one side surface of a base material and the marginal edge of the cover material is folded over a peripheral portion of the other side and bound thereto, the marginal edge not being subjected to excessive heat, deformation and tear damage on the soldered portions thereof.

Other objects and advantages of this invention will be apparent from a reading of the following specification and claims taken with the drawing.

DETAILED DESCRIPTION OF THE INVENTION

Figure 2:
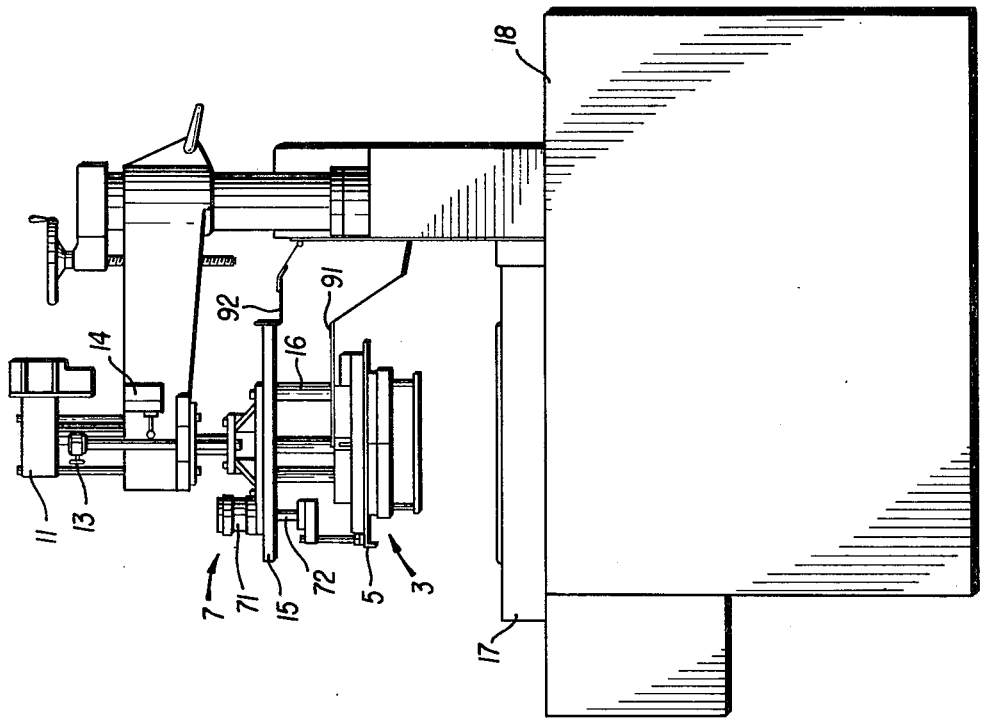
FIG. 2 is a side elevational view of the assembly of FIG. 1.
Figure 1:
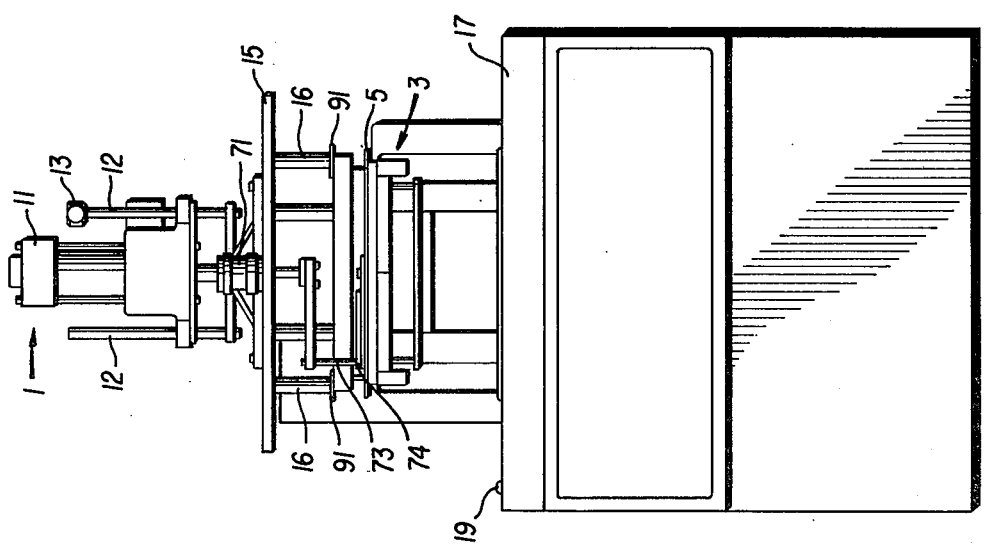
FIG. 1 is a front elevational view of an entire high frequency welder assembly according to this invention.

Referring to the drawing, where like reference numerals refer to like parts, FIGS. 1 and 2 respectively show an entire high frequency welder assembly according to this invention. A press apparatus 1 of known construction is used. It includes an air cylinder 11, a guide rod 12, a contact head 13, a limit switch 14, a horizontal table 15, upright connecting rods 16 made from insulating material, a press table 17, a machine platform 18 and a starting switch 19.

Figure 5:
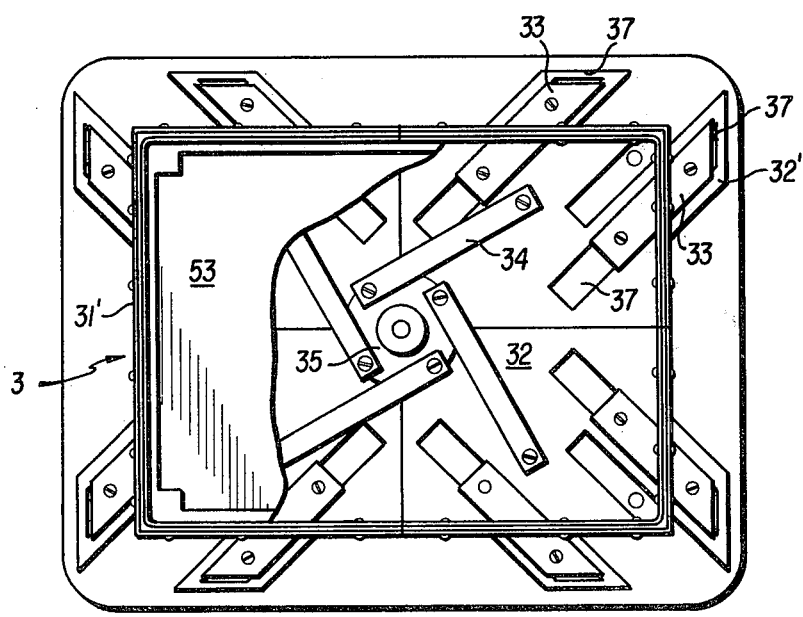
FIG. 5 is a bottom view of the assembly of FIG. 4.
Figure 6:
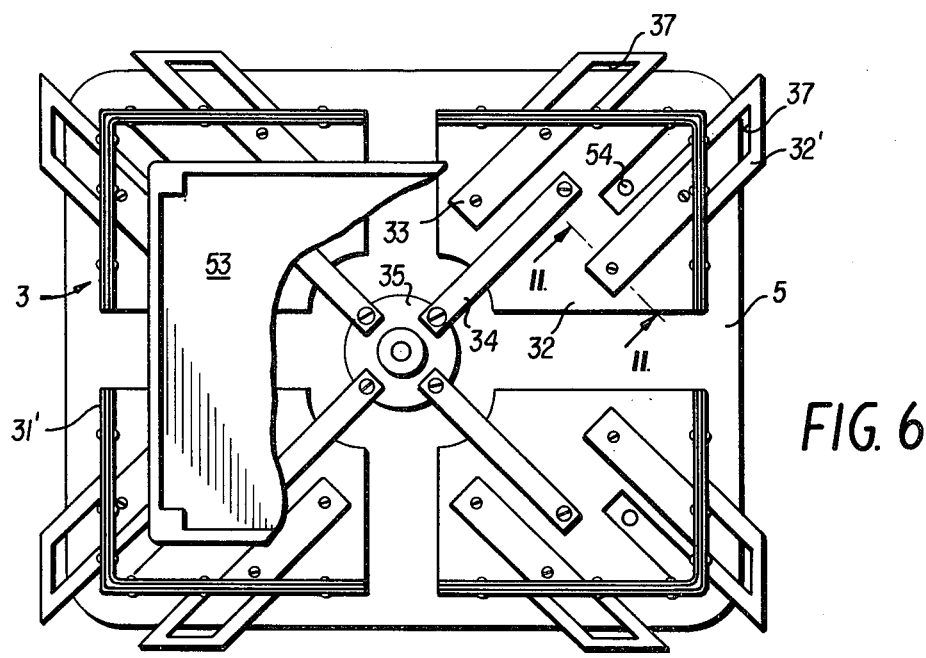
FIG. 6 is the same view as in FIG. 5 but showing the folding sections when extended apart.

A folder frame 3 is suspended by a support assembly 5. Folder frame 3 consists of four separable, vertically oriented molding sections 31 as will be described in more detail hereinafter. The four folding sections are in an extended condition at times of other than the drawing operation as best shown in FIG. 6. During the drawing operation, the four folding sections are brought together by means of a drawing handle 36 which swings through a predetermined angle to impart to mold frame 3 an elongated form as best shown in FIG. 5.

Also in FIGS. 1 and 2 there is shown a driving means 7 for driving drawing handle 36. Driving means 7 includes an air motor 71 which is connected to handle 36 via an output shaft 72, an L-shaped lever 73 connected with one end of said shaft, and a sliding roller 74 (also see FIG. 3) attached on the other end thereof. Folder frame 3, the drawing means components listed above and hereinafter, and support assembly 5 are conductors and typically may be made from copper.

Figure 7:
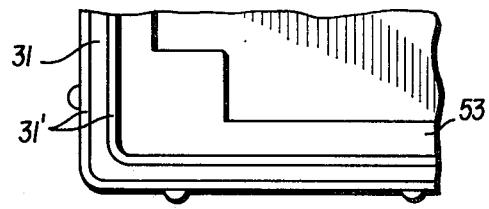
FIG. 7 is an enlarged bottom view showing a part of the assembly of FIG. 5.
Figure 11:
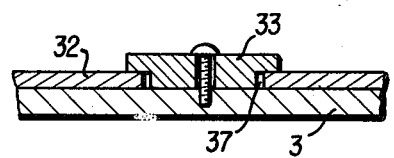
FIG. 11 is a part sectional view taken along the line 11—11 of FIG. 6.

The lower end faces of folding sections 31 are faced in opposition to press table 17. A cover 2 and a base 4 are placed on table 17. As shown in FIGS. 5 to 10, heat insulating sheets 31' made from bakelite or the like are affixed by appropriate means such as rivets to the lower portions of folding sections 31 on one side only, or on both sides of each section, as illustrated in FIG. 7.

Figure 3:
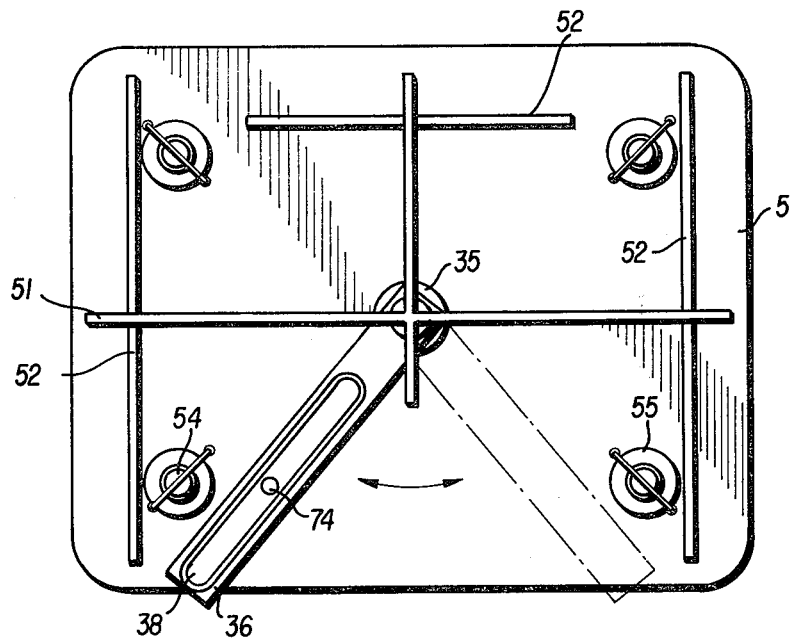
FIG. 3 is a plan view of a folder support assembly.
Figure 4:
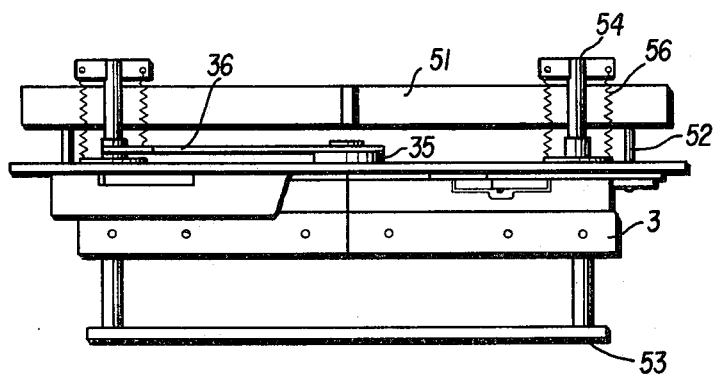
FIG. 4 is a partially broken side view of the assembly of FIG. 3 and the folder supported thereby, the folder having separable, folding sections where the sections are shown brought together.

Folding sections 31 are typically integrally connected to annex sheets 32 sliding on the lower surface of support assembly 5 where sections 31 are perpendicular to sheets 32. A rotary disc 34 is loosely fitted through the center of support assembly 5. The lower surface of rotary disc 35 is circumferentially rivetted with respective one ends of pivot arm members 34, while annex sheets 32 are connected to the other ends of the pivot arm members by means of rivets or the like. Each annex sheet 32 has two rhombic rims 32' extending from respective sides of folding sections 31. Rhombic rims 32' provide in the interior a guide recess 37 extending to the interior of annex sheets 32. Fixed members 33 occupy approximately two thirds of guide recesses 37 and are fixed to the lower surface of support assembly 5 by screws or the like so as to support annex sheets 32 via dovetail joints or the like. Drawing handle 36 is provided on the upper surface of support assembly 5, and one end thereof is fixed with rotary disc 35. As shown in FIG. 3, a guide groove 38 is provided on the upper surface of drawing handle 36. Roller 74 (see FIG. 1) provided on the lower end face of L-shaped lever 73 is fitted in guide groove 38 and moved to swing drawing handle 36.

On the upper surface of support assembly 5 a cross-shaped electrode holder 51 is provided by way of three connection holders 52, holders 51 and 52 being conductors and typically being made from copper. Electrode holder 51 is connected to upright rod 16 of press apparatus 1, so that support assembly 5 can be lowered and raised by means of press apparatus 1. Electrode holder 51 is connected with electrodes 91 of a high frequency generating circuit of well known construction, which is incorporated in press apparatus 1 where horizontal table 15 is connected to ground 92.

Support assembly 5 further includes sleeves 55 provided on the corners thereof, T-shaped push bars 54 loosely supported through sleeves 55, springs 56 extending from the upper end of push bars 54 to sleeves 55, and a horizontally disposed, push panel 53 connected to the respective lower ends of the four push bars 54.

Figure 8:
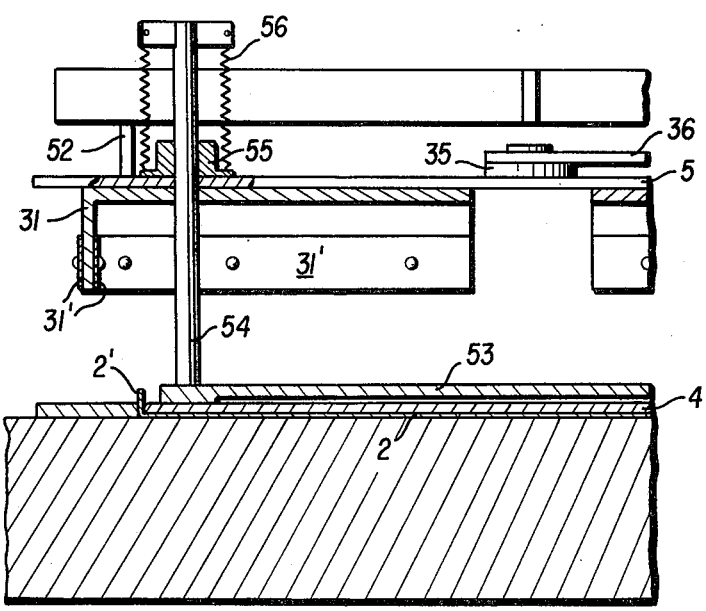
FIG. 8 is a view showing the folder support assembly after being initially lowered by a press apparatus, a cover material and a base material being in place on a table of the press apparatus.
Figure 9:
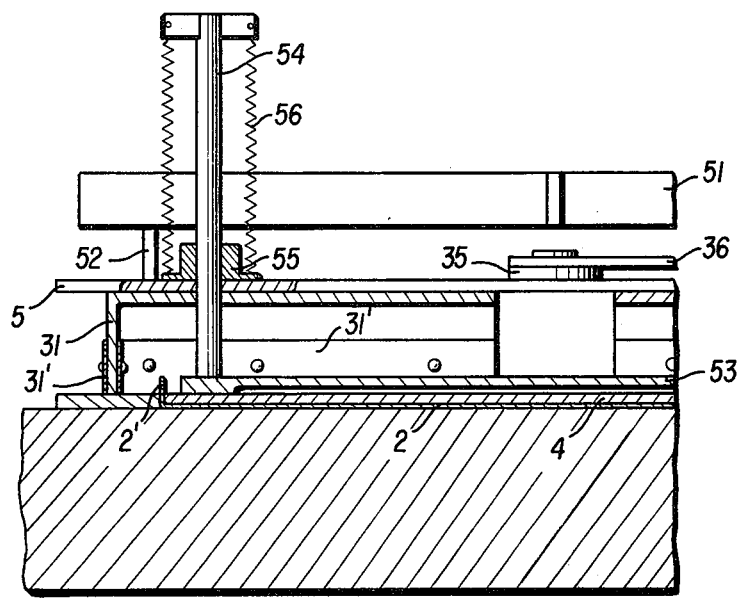
FIG. 9 is a view showing the folder support assembly in a position subsequent to that of FIG. 8 and immediately prior to the drawing operation of the separable folding sections.
Figure 10:
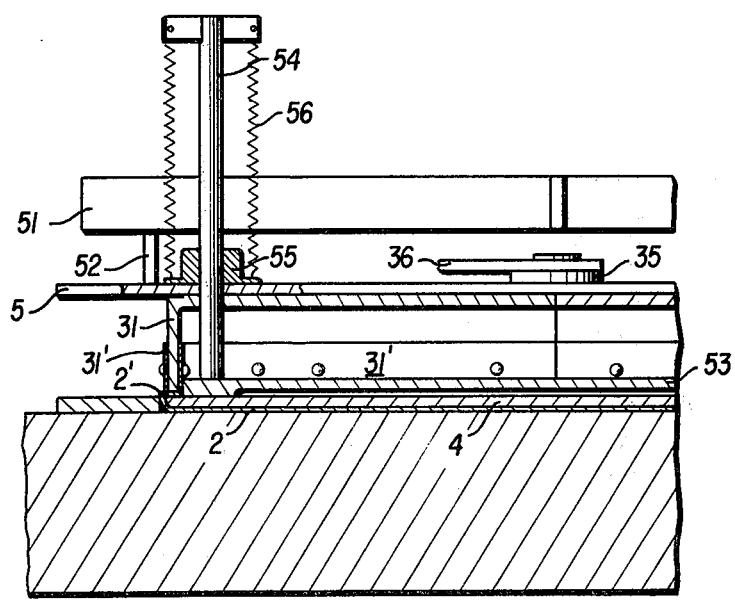
FIG. 10 is a view showing the folder support assembly in a position subsequent to that of FIG. 9 where the separable folding sections have been brought together and are applying pressure to the marginal edge of the cover material during the drawing operation.

In carrying out this invention, a concave folder of desired dimensions is provided on press table 17 as seen in FIGS. 8 to 10. Cover material 2 made from vinyl or the like having a marginal edge 2' is placed over the concave folder and subsequently a base material 4 made from card board or the like having both surfaces thereof coated with vinyl or a like resin is placed over cover material 2. Next, the high frequency welding apparatus of this invention can be operated continuously and automatically by depressing start switch 19 provided on press table 17. Press apparatus 1 is driven under air pressure to lower support assembly 5 to the position shown in FIG. 8 so that push panel 53 contacts base material 4, at which time limit switch 14 also contacts rod head 13. Associated operatively with limit switch 14, air motor 71 is driven to effect operation of the drawing means. The period of the drawing operation includes three sequential steps determined by timers (not shown) for respectively further lowering of support assembly 5, supplying high frequency electric current and interrupting the current to cool folder frame 3. FIGS. 9 and 10 show the result of the further lowering step by press apparatus 1 where springs 56 are expanded. Power is then transmitted from air motor 7 through output shaft 72 to L-shaped lever 73 whereby roller 74 slides along guide groove 36 to swing drawing handle 36 as shown in FIG. 3. As a result, rotary disc 35 is rotated and pivot arms 34 are pivoted so that annex sheets 32 integral with folding sections 31 are slid while meshing fixed sheets 33 along the side edges of guide recesses 37. Thus, the four folding sections 31 ae completely drawn inwards to form an elongated mold frame 3 as shown in FIG. 5. Thus, folding sections 31 are operated in harmony with press apparatus 1 to fold the marginal edge of cover material 2 after which sections 31 are positioned on the marginal edge under pressure to define elongated folder frame 3.

A timer (not shown) next supplies high frequency electric current via electrodes 91 to the marginal edge of cover material 2, thereby soldering and binding it onto base material 4. Upon completion of the soldering operation, the timer interrupts the current for a predetermined period to cool folder frame 3 and subsequently relieves the drawing operation thereby raising support assembly 5 to its original position, whereby folding sections 31 are also elevated and supported in their extended condition. As the result, there is obtained on press table 17 a cover product in excellent binding condition having neither deformation nor tear damage of cover material 2.

If a narrow soldering width is presented due to a narrow marginal edge of cover material 2, an insulating sheet 31' may be affixed selectively to the lower portion of folding sections 31 on only one side thereof. A temperature of typically around 180° C is applied to the soldering portion in direct contact with the lower end face of sections 31, approximately 120° C is applied to the soldering portion in contact with the interface between sections 31 and affixed insulating sheets 31' and about 100° C is applied to the soldering portion near the folding line of the marginal edge of cover material 2. In this manner, thermal distribution in gradually decreasing degrees provides end products of uniform soldering condition. Also, a thin insulating sheet may be provided directly on the lower end face of folder frame 3. Further, the cover material 2 useful in this invention is not limited to vinyl or other resin sheets but includes materials such as unwoven, solderable cloth.

What is claimed is:

1. Apparatus for binding the marginal edge of a cover material which has been folded over a base material, the apparatus comprising:
    means for generating high frequency electrical energy;
    pressing means comprising a folding frame for pressing said marginal edge against said base material and applying said electrical energy to said marginal edge to bind it to said base material;
    said pressing means including an electrically conductive first portion for conducting said high frequency electrical energy comprising at least one vertical disposed member extending along the length of said marginal edge, and at least one electrically insulative second portion comprising a layer of electrically insulative material disposed along at least one side of said vertically disposed member, where both said first and second portions contact said marginal edge so that the heat applied across the width of said marginal edge varies;
    a table adapted to dispose said cover material under said base material so that said marginal edge of the cover material substantially vertically extends above said base material;
    means for lowering said folding frame to said table and including means for maintaining sections of said folding frame in a separated condition while said frame is being lowered to said table; and
    means for drawing said folding frame sections together after said frame has been lowered to the table to fold and press the marginal edge over the base material.

2. Apparatus as in claim 1 including means for interrupting the application of said electrical energy after the lapse of a predetermined period of time to permit the bound edge to cool.

3. Apparatus for binding the folded marginal edge of a cover material over a base material, said apparatus comprising:
- a support for holding said cover material and said base material with the cover material underlaying said base material and the marginal edge of said cover material extending vertically;
- a movable folding frame disposed over said support and comprising a plurality of separable folding sections, each of said sections including a vertically disposed welding element; and
- means for lowering said folding frame and drawing said folding sections together so that said vertically disposed welding elements fold the marginal edge of said cover material over the top of said base material and press the folded marginal edge against said base material.

4. Apparatus as claimed in claim 3 and further comprising means for applying high frequency electrical energy to said welding elements while said welding elements press the folded marginal edge of said cover material against said base material.

5. Apparatus for binding the folded marginal edge of a cover material over a base material, said apparatus comprising:
- a support for holding said cover material and said base material with the cover material underlaying said base material and the marginal edge of said cover material extending vertically;
- a movable folding frame disposed over said support and comprising a plurality of separable folding sections, each comprising a horizontal member, each of said sections also comprising a vertically disposed welding element connected to a separate one of said horizontal members; and
- means for lowering said folding frame and drawing said folding sections together so that said vertically disposed welding elements fold the marginal edge of said cover material over the top of said base material, said drawing means comprising a rotatable element and a plurality fo connecting elements each connected between said rotatable element and one of said horizontal members whereby said welding elements are drawn together as said rotatable element turns.

* * * * *